(12) United States Patent
Wang

(10) Patent No.: US 8,444,304 B2
(45) Date of Patent: May 21, 2013

(54) REPTILE LAMP

(75) Inventor: Yu-Chin Wang, Taipei (TW)

(73) Assignee: EIKO Electric Products Corp., Taipei (TW)

( * ) Notice: Subject to any disclaimer, the term of this patent is extended or adjusted under 35 U.S.C. 154(b) by 173 days.

(21) Appl. No.: 13/168,944

(22) Filed: Jun. 25, 2011

(65) Prior Publication Data

US 2012/0327648 A1  Dec. 27, 2012

(51) Int. Cl.
*B60Q 1/124* (2006.01)

(52) U.S. Cl.
USPC ............................ 362/458; 362/125; 362/253

(58) Field of Classification Search
USPC ............ 362/101, 124–126, 227–231, 249.02, 362/253, 458, 800
See application file for complete search history.

(56) References Cited

U.S. PATENT DOCUMENTS 6,905,233 B1 * 6/2005 Blumenfeld-Kesler ...... 362/376

* cited by examiner

*Primary Examiner* — Jason Moon Han
(74) *Attorney, Agent, or Firm* — Guice Patents PLLC

(57) ABSTRACT

A reptile lamp for installation in a top side of a reptile tank to provide illumination is disclosed to include a housing equipped with a high-voltage circuit and a LED start control circuit, a LED lamp panel mounted inside the housing and electrically connected to the LED start control circuit and carrying multiple white LEDs and red LEDs for emitting white light or red light subject to the control of the LED start control circuit, and phosphor-coated cold cathode tubes mounted inside the housing and electrically connected to the high-voltage circuit for emitting ultraviolet light.

5 Claims, 4 Drawing Sheets

REPTILE LAMP

BACKGROUND OF THE INVENTION

1. Field of the Invention

The present invention relates to reptile lamp technology and more particularly, to an improved structure of reptile lamp, which is a combination of a LED lamp and a cold cathode tube.

2. Description of the Related Art

People who love reptiles as pets may use a reptile tank to raise reptiles, such as frogs, snakes, tortoises, geckos and lizards. Further, reptile tanks are also intensively used in animal exhibition centers to keep reptiles.

A reptile tank is generally equipped with a lighting fixture to simulate daylight. Conventionally, incandescent lamps are commonly used in reptile tanks to provide light. Nowadays, LED lamps are intensively used to substitute for conventional incandescent lamps for use in reptile tanks. However, conventional reptile lamps do not radiate ultraviolet light rays. In order to help reptiles grow up healthy and to sterilize the surroundings, an extra ultraviolet lamp may be necessary.

Installing different lamps having different functions in a reptile tank occupies much tank space and costs a lot.

SUMMARY OF THE INVENTION

The present invention has been accomplished under the circumstances in view. It is one object of the present invention to provide a reptile lamp, which is selectively controllable to emit white light, red light and ultraviolet light to fit different requirements, and has the characteristics of space saving, low power consumption and cost effectiveness.

To achieve this and other objects of the present invention, a reptile lamp for installation in a top side of a reptile tank to provide illumination comprises a housing equipped with a high-voltage circuit and a LED start control circuit, a LED lamp panel mounted inside the housing and electrically connected to the LED start control circuit and carrying multiple white LEDs and red LEDs for emitting white light or red light subject to the control of the LED start control circuit, and phosphor-coated cold cathode tubes mounted inside the housing and electrically connected to the high-voltage circuit for emitting ultraviolet light.

Further, a reflector is mounted inside the housing around each cold cathode tube to limit the angle of illumination of each cold cathode tube, avoiding accidental human injury.

Further, the cold cathode tubes are respectively selectively configured to emit one of long-wave ultraviolet light, middle-wave ultraviolet light and short-wave ultraviolet light.

Further, the LED start control circuit comprises a programmable time control system for controlling the operating time of said white light emitting diodes and said red light emitting diodes subject to a respective predetermined time period.

DETAILED DESCRIPTION OF THE PREFERRED EMBODIMENT

Figures 1, 1A:
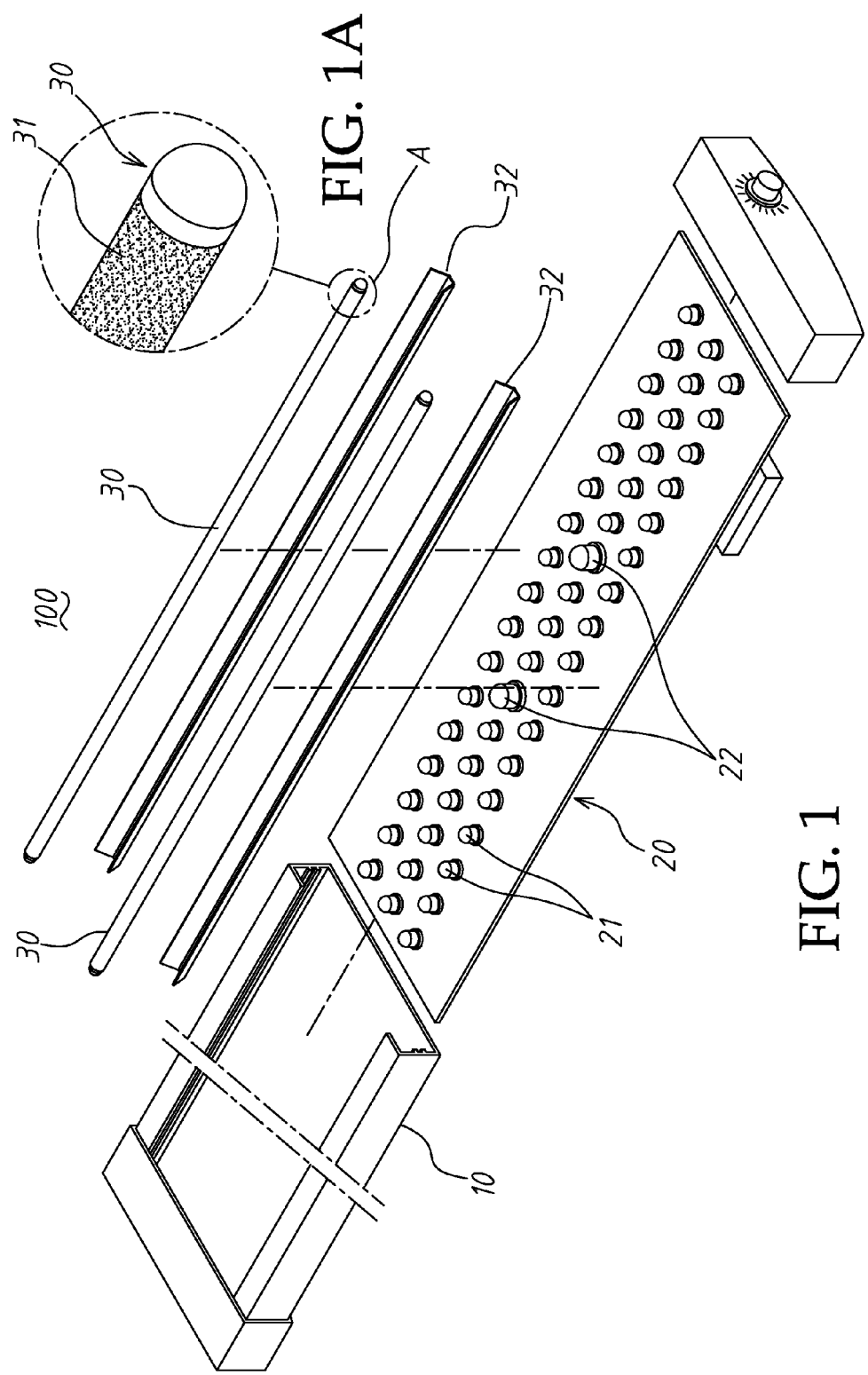
FIG. 1 is an exploded view of a reptile lamp in accordance with the present invention.
FIG. 1A is an enlarged view of part A of FIG. 1.
Figure 2:
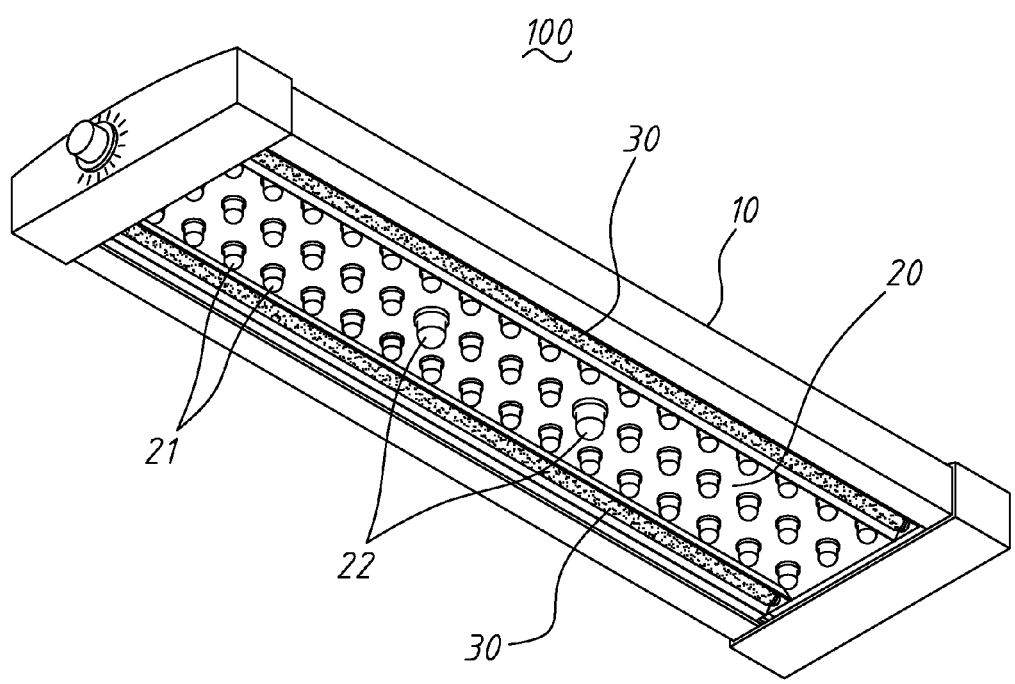
FIG. 2 is an elevational assembly view of the reptile lamp in accordance with the present invention.
Figure 3:
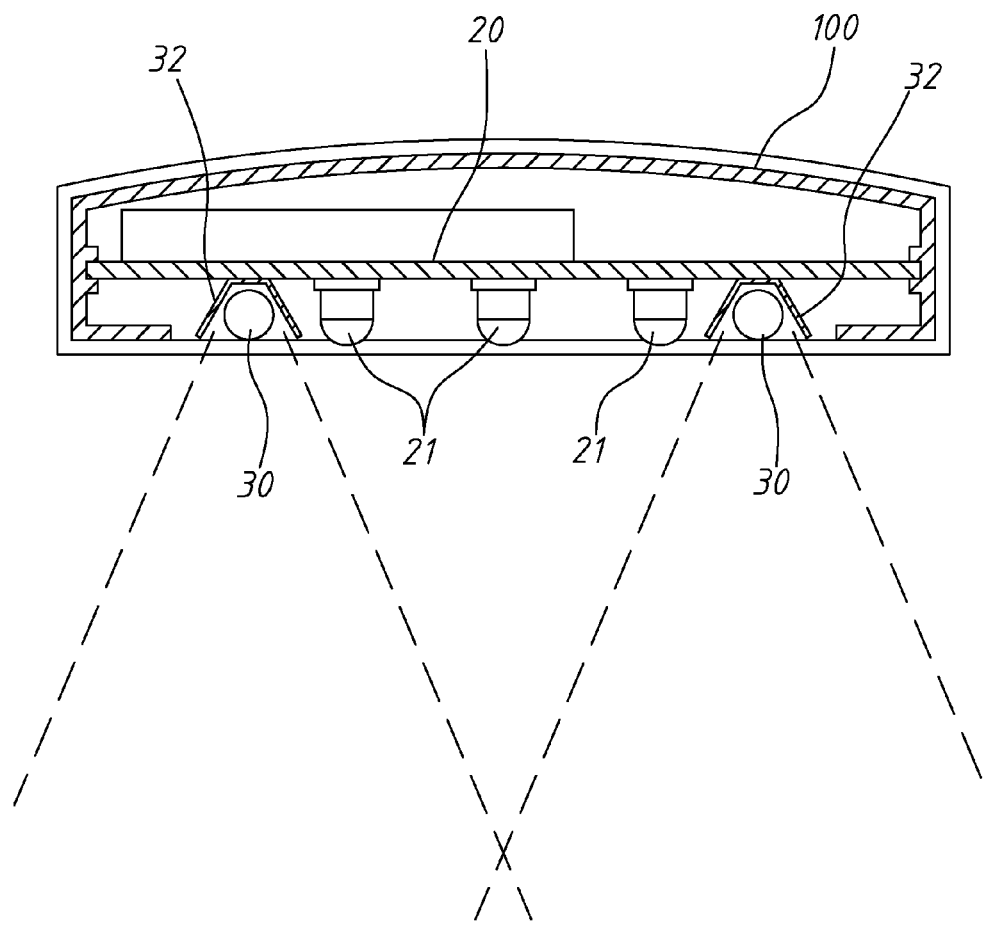
FIG. 3 is a schematic sectional view of the reptile lamp in accordance with the present invention reptile lamp in accordance with the present invention.
Figure 4:
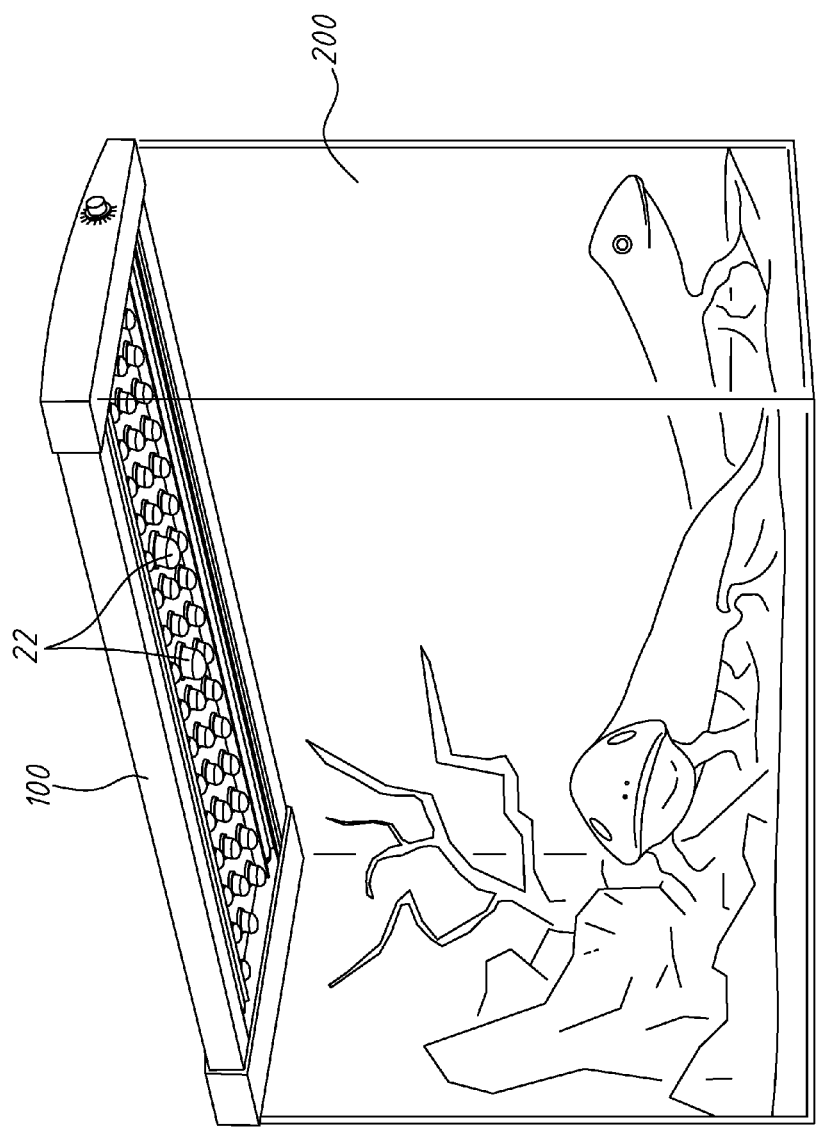
FIG. 4 is an applied view of the present invention, illustrating the reptile lamp installed in a reptile tank

Referring to FIG. 4, a reptile lamp 100 in accordance with the present invention is shown installed in a top side of a reptile tank 200 to provide illumination. As illustrated in FIGS. 1-3, the reptile lamp 100 comprises a housing 10, a LED lamp panel 20 and two cold cathode tubes 30.

The housing 10 houses the LED lamp panel 20 and the cold cathode tubes 30, and is equipped with an internal high-voltage circuit and a LED start control circuit (not shown) for controlling the operation of the LED lamp panel 20 and the cold cathode tubes 30. The LED lamp panel 20 carries multiple white LEDs 21 and two red LEDs 22. Further, the LED lamp panel 20 is mounted inside the housing 10 and electrically connected with the internal LED start control circuit in the housing 10 for emitting white light (by means of the white LEDs 21) during the day, or red light at night (by means of the red LEDs 22). The cold cathode tubes 30 are mounted inside the housing 10 and disposed at two opposite lateral sides relative to the LED lamp panel 20. As illustrated in FIG. 1A, each cold cathode tube 30 is coated with a layer of phosphor coating 31 for generating ultraviolet rays downwardly out of the bottom side of the housing 10. Further, a reflector 32 is mounted inside of the housing 10 around the upper part of each cold cathode tube 30 to reflect emitted ultraviolet light downwardly out of the bottom side of the housing 10, as shown in the imaginary lines in FIG. 3, limiting the angle of radiation of each cold cathode tube 30.

Further, the LED start control circuit in the housing 10 of the reptile lamp 100 comprises a programmable time control system for controlling the operating time of the white LEDs 21 and the red LEDs 22, enabling the white LEDs 21 and the red LEDs 22 to emit light at different time periods.

Further, the cold cathode tubes 30 of the reptile lamp 100 can be selectively configured to emit long-wave ultraviolet light (UVa) of wavelength 315~400 ηm, middle-wave ultraviolet light (UVb) of wavelength 280~215 ηm or short-wave ultraviolet light (UVc) of wavelength 100~180 ηm.

As stated above, the invention utilizes the white LEDs 21 to emit white light, the red LEDs 22 to emit red light, and the cold cathode tubes 30 into the reptile lamp 100, the reptile lamp 100 provides multiple functions, saving the cost and power consumption.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A reptile lamp for installation in a top side of a reptile tank to provide illumination, comprising:
    a housing for installation on the reptile tank having arranged therein a high-voltage circuit and a LED start control circuit;
    a LED lamp panel mounted inside said housing and electrically connected to said LED start control circuit of said housing, said LED lamp panel comprising a plurality of white light emitting diodes for emitting white light subject to the control of said LED start control circuit and a plurality of red light emitting diodes for emitting red light a subject to the control of said LED start control circuit; and at least one cold cathode tube coated with a layer of phosphor coating and mounted inside said housing adjacent to said LED lamp panel and electrically connected to said high-voltage circuit for emitting ultraviolet light toward a predetermined angle.

2. The reptile lamp as claimed in claim 1, further comprising at least one reflector mounted inside said housing around each said cold cathode tube to limit the angle of illumination of each said cold cathode tube.

3. The reptile lamp as claimed in claim 2, wherein the number of said at least one cold cathode tube and the number of said at least one reflector are respectively 2, and the two cold cathode tubes are arranged in said housing at two opposite lateral sides relative to said LED lamp panel.

4. The reptile lamp as claimed in claim 3, wherein said two cold cathode tubes are respectively selectively configured to emit one of long-wave ultraviolet light, middle-wave ultraviolet light and short-wave ultraviolet light.

5. The reptile lamp as claimed in claim 1, wherein said LED start control circuit comprises a programmable time control system for controlling the operating time of said white light emitting diodes and said red light emitting diodes subject to a respective predetermined time period.

* * * * *